(12) United States Patent
Serowy et al.

(10) Patent No.: US 7,656,066 B2
(45) Date of Patent: Feb. 2, 2010

(54) ELECTRONICALLY COMMUTATED MOTOR WITH BEARING CHAMBER DEFINED BY OPPOSING ABUTMENT SURFACES

(75) Inventors: Boris Serowy, VS-Villingen (DE); Bernd Maier, Triberg (DE)

(73) Assignee: EBM-PAPST St. Georgen GmbH & Co. KG, St. Georgen (DE)

( * ) Notice: Subject to any disclaimer, the term of this patent is extended or adjusted under 35 U.S.C. 154(b) by 283 days.

(21) Appl. No.: 11/614,144

(22) Filed: Dec. 21, 2006

(65) Prior Publication Data

US 2007/0183907 A1      Aug. 9, 2007

(30) Foreign Application Priority Data

Feb. 3, 2006      (DE) .................. 20 2006 002 069 U

(51) Int. Cl.
*H02K 5/16* (2006.01)
(52) U.S. Cl. ........................ 310/90; 310/67 R
(58) Field of Classification Search ............. 310/49 R, 310/67 R, 90
See application file for complete search history.

(56) References Cited

U.S. PATENT DOCUMENTS

| | | | |
|---|---|---|---|
| 4,612,468 A | 9/1986 | Stürm et al. ................. 310/67 |
| 4,682,065 A * | 7/1987 | English et al. ................ 310/90 |
| 4,737,673 A * | 4/1988 | Wrobel ........................ 310/90 |
| 4,955,791 A | 9/1990 | Wrobel ........................ 417/354 |
| 5,170,086 A * | 12/1992 | Wrobel et al. .............. 310/217 |
| 5,666,011 A | 9/1997 | Hong ........................ 310/40.5 |
| 6,050,786 A | 4/2000 | Lin ............................. 417/366 |
| 6,318,976 B1 | 11/2001 | Hsieh ..................... 417/423.12 |
| 6,897,586 B2 * | 5/2005 | Horng et al. .................. 310/90 |
| 7,015,610 B2 * | 3/2006 | Horng et al. .................. 310/90 |
| 7,091,639 B2 * | 8/2006 | Rojo Lulic .................. 310/90 |
| 2004/0136842 A1 | 7/2004 | Obara et al. ................ 417/354 |
| 2005/0098641 A1 | 5/2005 | Ardelt et al. ............... 236/49.3 |
| 2006/0012255 A1 * | 1/2006 | Ku et al. ....................... 310/58 |

FOREIGN PATENT DOCUMENTS

DE    20 2004-016545 U    12/2004
EP         0 378 983 A     1/2004

* cited by examiner

*Primary Examiner*—Thanh Lam
(74) *Attorney, Agent, or Firm*—Milton Oliver, Esq.; Oliver Intellectual Property LLC

(57) ABSTRACT

An easy-to-assemble electric motor (21) features an internal stator (50), an external rotor (22) having a shaft (34), which external rotor is configured as a rotor cup or bell (24) having an outer side and an inner side (25), a bearing tube (70) for receiving a bearing arrangement (60) journaling the shaft (34), which bearing tube (70) has a first end portion (71) facing toward the inner side (25) of the external rotor (22) and being formed with an inwardly protruding stop (73), the bearing tube having a second end portion (75) facing away from the first end portion (71) and being joined to a plastic part (80) that likewise forms an inwardly protruding stop (77) adjacent a second end portion (75), the bearing arrangement (60) being located in the bearing tube (70) in a chamber defined between said two inwardly protruding stops (73, 77).

22 Claims, 5 Drawing Sheets

ELECTRONICALLY COMMUTATED MOTOR WITH BEARING CHAMBER DEFINED BY OPPOSING ABUTMENT SURFACES

FIELD OF THE INVENTION

The invention relates to an electronically commutated motor, in particular to a miniature and subminiature motor. Such motors are preferably used in miniature or subminiature fans.

BACKGROUND

Miniature and subminiature fans of this kind have very small dimensions and correspondingly weigh very little. Fans of the ebm-papst 250 series, for example, have dimensions of 8×25×25 mm and weigh approx. 5 g. For fans of the ebm-papst 400 series, the dimensions are 20×40×40 mm and the weight is <30 g. The fan motors are accordingly even smaller and weigh even less than the fan as a whole.

With such motors, assembly must be simple and uncomplicated, in order to allow cost-effective manufacture and a high level of automation. Uniform quality, which is a prerequisite for a long average service life, can be achieved by extensive automation.

SUMMARY OF THE INVENTION

It is therefore an object of the invention to make available an improved miniature or subminiature motor whose assembly steps can readily be automated.

According to the invention, this object is achieved by a motor having an external rotor whose central shaft is journaled in a bearing tube containing first and second ball bearings in a chamber defined between a first inwardly protruding shoulder or stop at the top of the chamber and a second inwardly protruding shoulder or stop at the bottom of the chamber, the second stop being preferably formed by an injection-molding step during assembly.

A motor according to the present invention can, in particular, be built in a very compact manner. Nevertheless, automated manufacture of small fans of uniformly high quality can be achieved.

BRIEF FIGURE DESCRIPTION

Further details and advantageous refinements of the invention are evident from the exemplifying embodiments, in no way to be understood as a limitation of the invention, that are described below and shown in the drawings.

DETAILED DESCRIPTION

Figure 1:
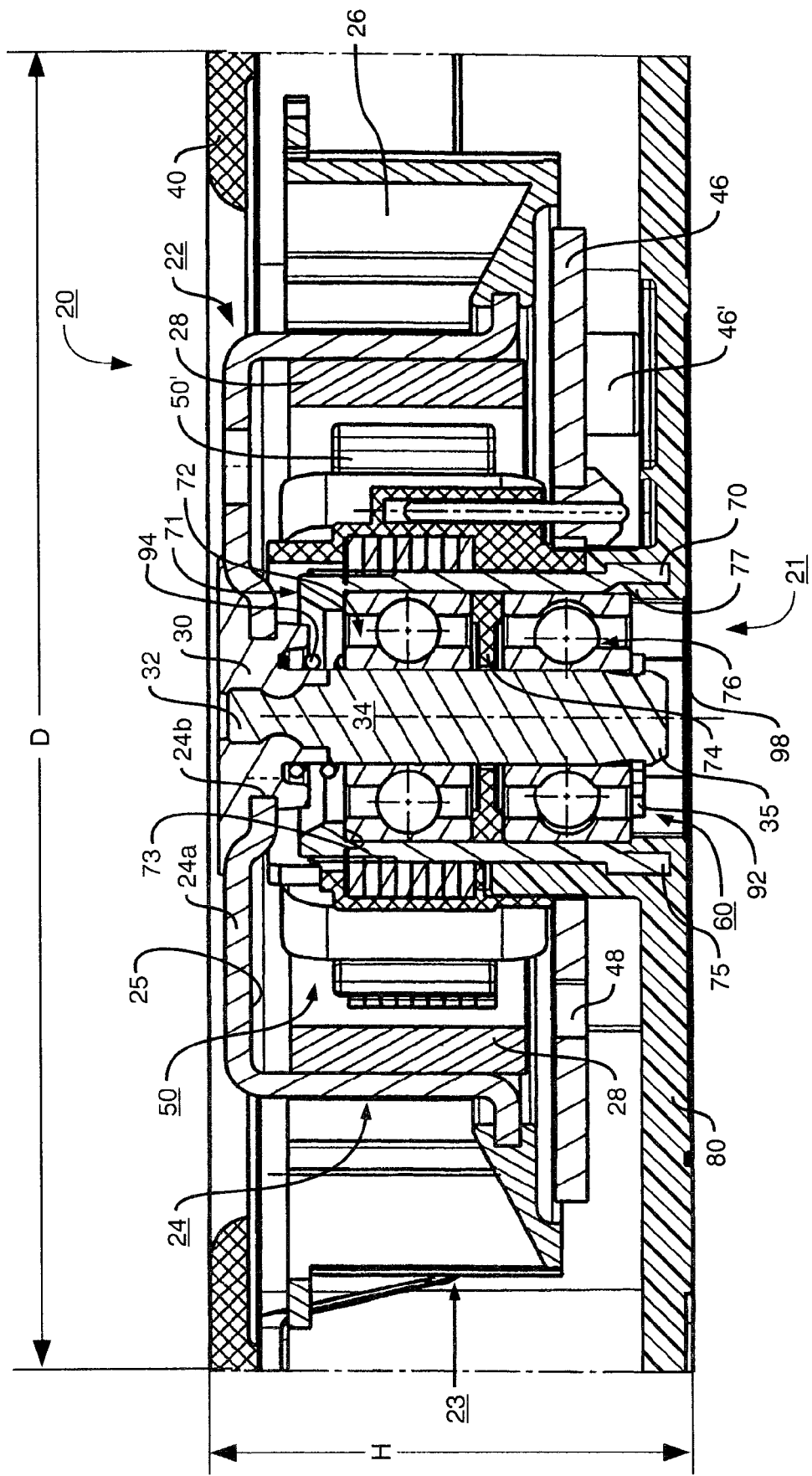
FIG. 1 is a longitudinal section through a fan that is driven by a subminiature motor.

In the description that follows, the terms "left," "right," "top," and "bottom" refer to the respective figure of the drawings and can vary from one figure to the next, depending on the orientation (portrait or landscape) selected in each case. Identical or identically functioning parts are labeled with the same reference characters in the various figures, and are usually described only once.

FIG. 1 is a longitudinal section, at greatly enlarged scale, through a radial fan 20 having a motor 21 according to a preferred embodiment of the invention. In a practical embodiment of the fan such as the one shown in FIG. 1, height H was 15 mm and dimension D was 51 mm, i.e. FIG. 1 shows this fan enlarged approximately 4.5 times.

Motor 21 has an external rotor 22, an internal stator 50 having a stator lamination stack 50', and a bearing tube 70 mounted on a plastic part 80. External rotor 22 has a rotor cup 24 made of deep-drawn soft iron, on whose outer periphery is provided a fan wheel 23 having fan blades 26. A rotor magnet 28 that can be magnetized, for example with four poles, is mounted on the inner periphery of rotor cup 24. Rotor cup 24 has a base 24a having a central opening 24b that is joined via a hub 30 (made of a die-cast alloy, e.g. ZAMAK[1] or the like) to upper end 32 of a rotor shaft 34 that has a lower free end 35.

[1] Reg. Trademark of Horsehead Industries Inc. for Zinc-base alloys.

Internal stator 50 of motor 21 is mounted on the outer side of bearing tube 70. Also arranged there is a circuit board 46 having a Hall sensor integrated circuit (IC) 48, on which board are located components for electronic commutation of motor 21, for example an IC 46'. As is apparent from FIG. 1, circuit board 46 is arranged between rotor magnet 28 and stator lamination stack 50' on the one hand and IC 46' on the other hand.

A bearing arrangement 60 is arranged in a chamber defined by bearing tube 70, for purposes of journaling shaft 34. Said arrangement has, at its top, a first rolling bearing 72 and, at its bottom, a second rolling bearing 76, which are arranged at a predetermined distance from one another. This distance is defined by an annular spacing member 74, for example an annular disk as shown. Bearing arrangement 60 is, however, not limited to a specific bearing type; instead, a variety of bearing types can be used, for example plain bearings.

Upper (in FIG. 1) end portion 71 of bearing tube 70 faces toward inner side 25 of rotor cup 24, and is equipped on its inner side with a stop 73, against which outer ring 72" of rolling bearing 72 abuts. Lower (in FIG. 1) end portion 75 of bearing tube 70 is equipped on its inner side with an enlargement 78, in order to facilitate the introduction of rolling bearings 72, 76 into bearing tube 70.

Lower end portion 75 of bearing tube 70 is mounted on plastic part 80 by plastic injection molding, in such a way that the plastic which is injection-molded onto bearing tube 70 forms a stop 77 against which outer ring 76" of lower rolling bearing 76 abuts. Lower end portion 75, injection-embedded into plastic part 80, is covered by an adhered plate 98 made of metal, or another suitable cover. Adhered plate 98 can serve as an identification plate.

Bearing tube 70 and bearing arrangement 60 are described in detail with reference to FIGS. 3 to 5.

As FIG. 1 shows, shaft 34 is held by a snap ring 92, serving as a support member or retaining element, and by a schematically depicted compression spring 94. Snap ring 92 is snapped into an annular groove at free end 35 of shaft 34. Compression spring 94 is arranged between inner ring 72' of rolling bearing 72 and hub 30. Compression spring 94 presses second rolling bearing 76 against snap ring 92, so that ball bearings 72, 76 are tensioned with respect to each one another.

Figure 2:
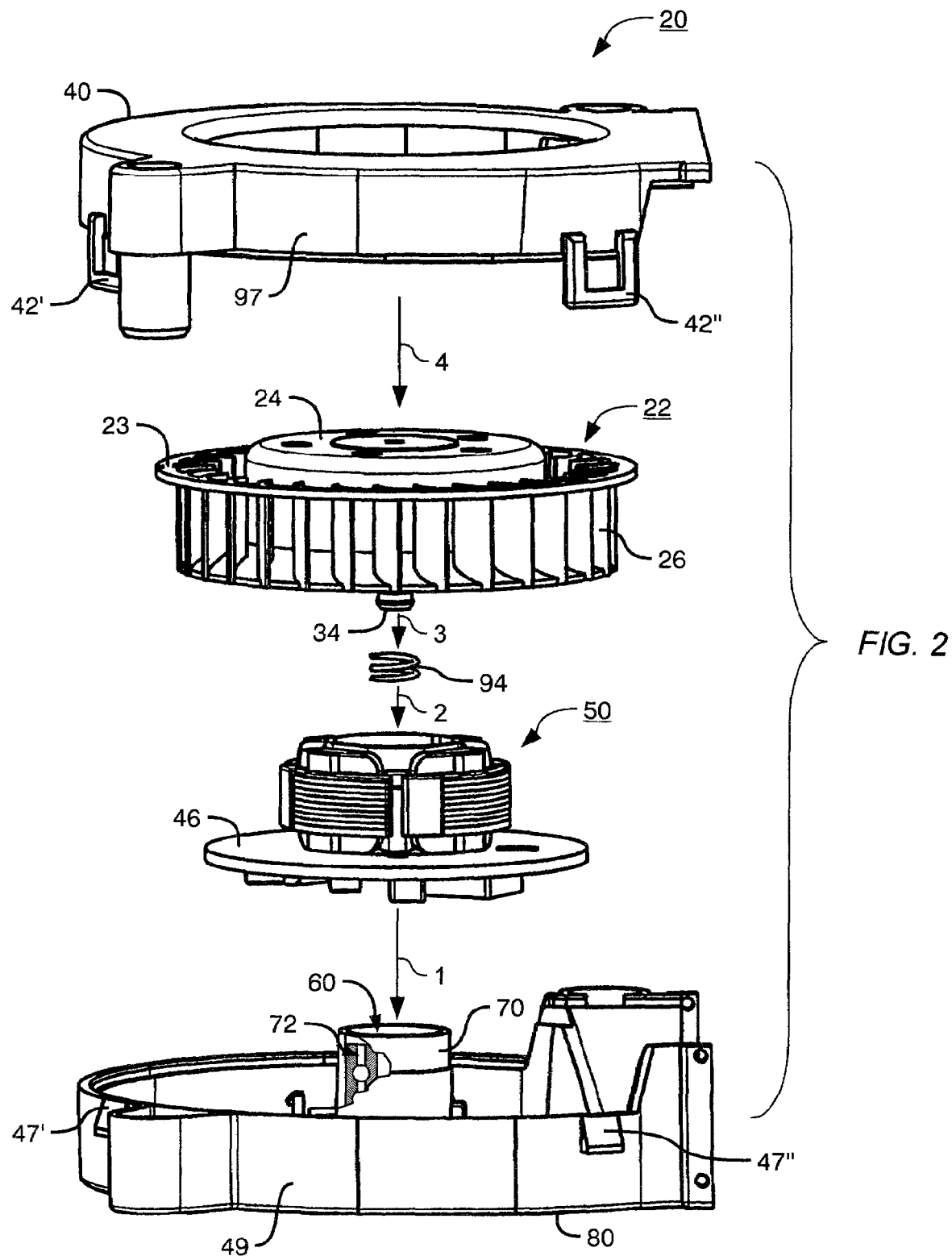
FIG. 2 is an exploded depiction of the fan of FIG. 1.

FIG. 2 is an exploded three-dimensional depiction of fan 20 of FIG. 1, illustrating the assembly process. Components of fan 20 are depicted as preassembled components, which are assembled in accordance with steps schematically shown in FIG. 2.

In a first working step, internal stator 50 is arranged, together with circuit board 46, on the outer surface of bearing tube 70, as indicated by an arrow 1. As FIG. 2 shows, plastic part 80 has an upwardly-directed wall 49 on which outwardly-directed latching hooks 47', 47" are arranged.

In a second working step, compression spring 94 is arranged on bearing arrangement 60 arranged in bearing tube 70 (cf. FIG. 1), as indicated by an arrow 2. Alternatively, compression spring 94 can be mounted on shaft 34 on external rotor 22.

In a third working step, shaft 34 of rotor 22, whose fan wheel 23, having blades 26, is shown by way of example in FIG. 2, is introduced through compression spring 94 into bearing tube 70, as indicated by an arrow 3, so that rotor cup 24 surrounds internal stator 50 like a bell. Shaft 34 is then secured within bearing arrangement 60 by snap ring 92, so the shaft cannot be pulled out.

In a concluding working step, a cover part 40 is mounted onto plastic part 80, as indicated by an arrow 4. Cover part 40 has a wall 97 directed downward (in FIG. 2) on which are arranged outwardly-directed latching members 42', 42". The latter, upon assembly of cover part 40 with or onto part 80, are pushed over latching hooks 47', 47" of part 80, form a latching connection therewith, and form a fan housing that protects the components of fan 20 from external influences.

Figure 3:
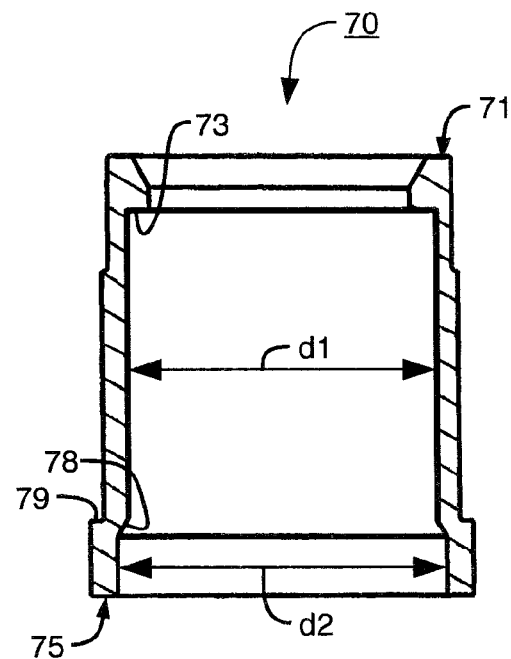
FIG. 3 is a sectioned view of the bearing tube of FIGS. 1 and 2.

FIG. 3 is a longitudinal section through bearing tube 70. The latter has, at the top, a shoulder 73 forming a stop, and at the bottom has an enlargement 78. Inside diameter d1 of bearing tube 70 transitions, at enlargement 78, to a larger inside diameter d2 (d1<d2). Located on the external periphery of bearing tube 70, adjacent enlargement 78, is a shoulder 79 that, when bearing tube 70 is injection-embedded into part 80, provides additional protection against escape of bearing tube 70 from part 80.

Figure 4:
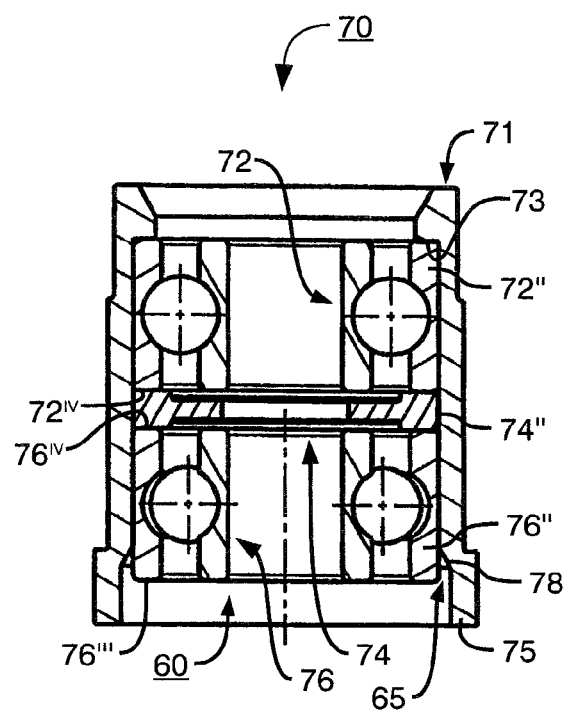
FIG. 4 is a sectioned view of the bearing tube of FIG. 3, having a bearing arrangement according to FIG. 5 arranged therein.
Figure 6:
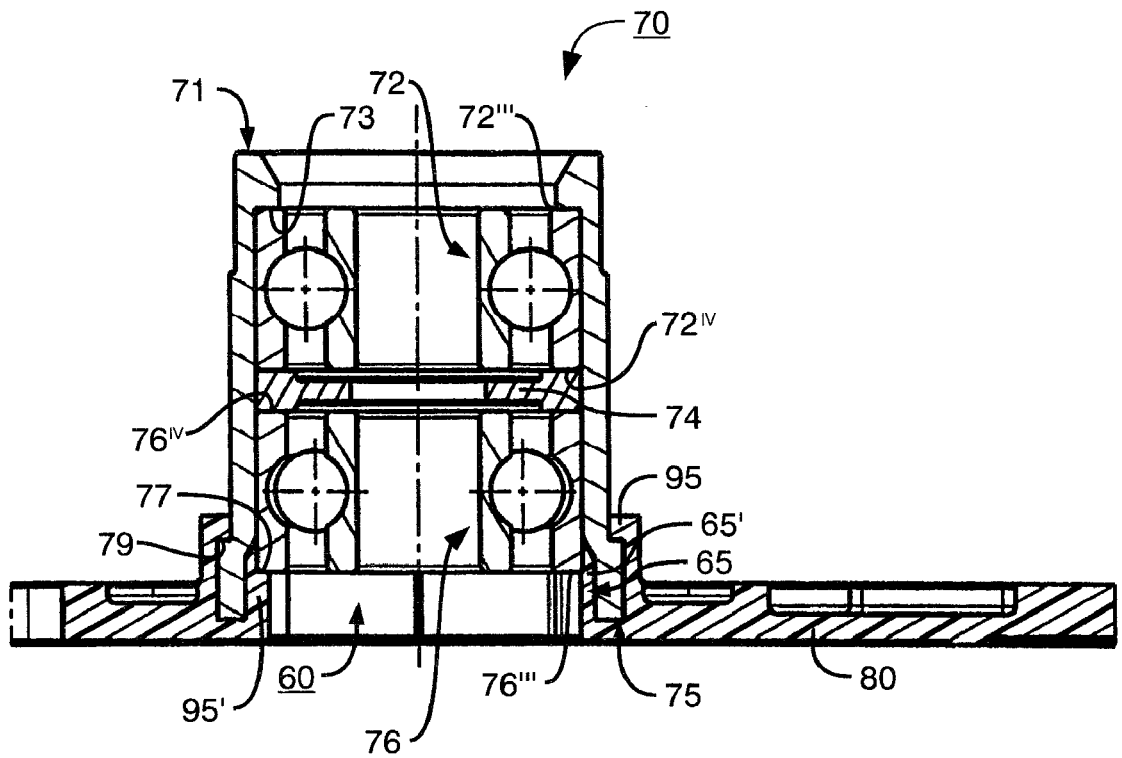
FIG. 6 is a sectioned view of the arrangement according to FIG. 5, having a plastic part in the form of a flange injection-molded onto it.

FIG. 4 is a longitudinal section through bearing tube 70 and bearing arrangement 60 arranged therein. An upper end face 72''' of outer ring 72" abuts against stop 73. Arranged between outer rings 72" and 76" is spacing member 74, which abuts against a lower end face 72$^{IV}$ of outer ring 72" and an upper end face 76$^{IV}$ of outer ring 76". Provided at the bottom, between outer ring 76" and the inner side of bearing tube 70, is a cavity 65 that preferably is filled at least partially with plastic material upon mounting of bearing tube 70 on part 80, forming stop 77 (FIG. 6) that abuts against a lower end face 76''' of outer ring 76" (FIG. 6). To simplify illustration, shaft 34, and snap ring 92 thereon, have been omitted from FIG. 4.

Figure 5:
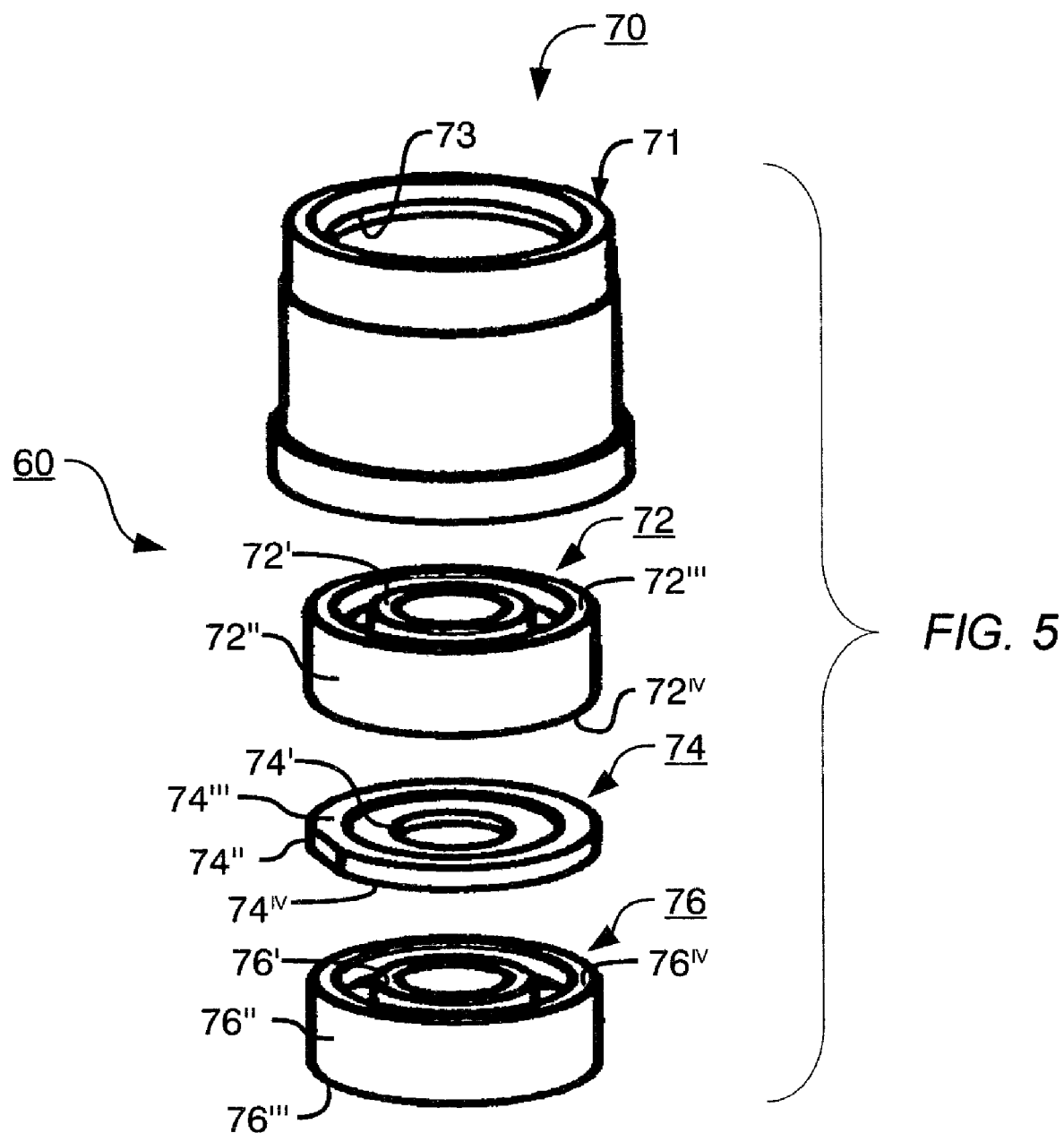
FIG. 5 is an exploded depiction of the bearing tube of FIG. 3, including the bearings.

FIG. 5 is an exploded depiction of bearing tube 70 and bearing arrangement 60. Spacing member 74 is thicker at its outer periphery 74" than at its inner periphery 74'.

For assembly, firstly rolling bearing 72 is introduced from below (in FIG. 4) into bearing tube 70 in such a way that upper end face 72''' of outer ring 72" of said bearing 72 abuts against shoulder or stop 73 at upper end portion 71 of bearing tube 70. Spacing member 74 is then introduced into bearing tube 70, in such a way that its upper face 74''' abuts against lower end face 72$^{IV}$ of outer ring 72". Lastly, second rolling bearing 76 is introduced into bearing tube 70, in such a way that upper end face 76$^{IV}$ of outer ring 76" of said bearing 76 abuts against a lower face 74$^{IV}$ of spacing member 74.

To prevent rolling bearings 72, 76 and spacing member 74 from sliding out of bearing tube 70, inside diameter d1 of bearing tube 70 can be selected in such a way that it is slightly smaller than the diameter of bearings 72, 76, so that the bearings are pressed into tube 70 upon assembly.

FIG. 6 is a longitudinal section through bearing tube 70, having bearing arrangement 60 arranged therein and having part 80 according to FIG. 2, which can be a part implemented in application-specific fashion, injection-molded onto bearing tube 70. The plastic of part 80 that is injection-molded onto bearing tube 70 forms an outer ring 95 that rests on top of shoulder 79 of bearing tube 70, and thus effects a solid coupling of these components.

As is apparent from FIG. 6, the plastic of part 80, that is injection-molded in this way, also forms an inner ring 95' that at least partially fills up cavity 65 with plastic 65' and forms stop 77.

Be it noted, however, that the injection molding of part 80 onto bearing tube 70 is described merely by way of example, as a preferred method for mounting bearing tube 70 on part 80. Other methods are likewise possible. For example, part 80 could be manufactured independently of bearing tube 70, which in that case would be press-fitted onto plastic part 80.

FIG. 6 illustrates the implementation of stops 73, 77 in the end regions of bearing tube 70, i.e. on its upper and lower end portions 71 and 75, respectively, thereby defining the bearing chamber.

Figure 7:
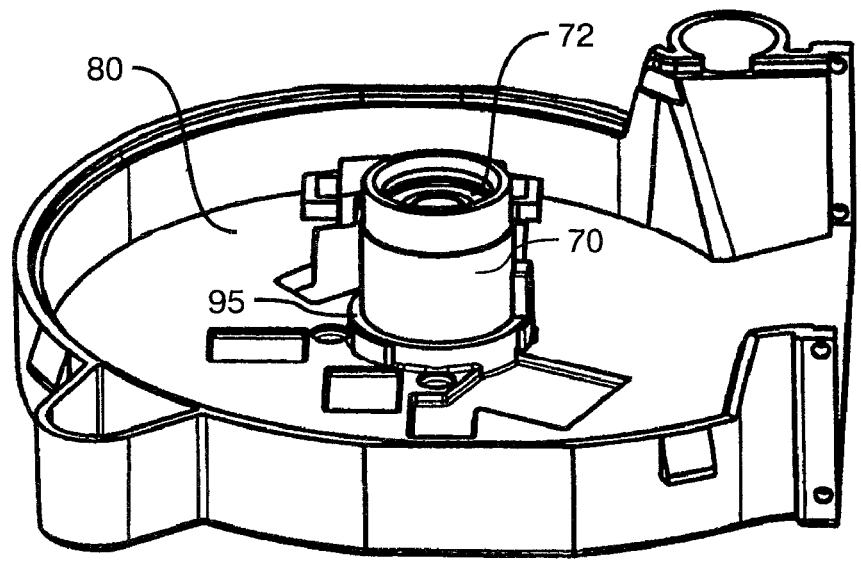
FIG. 7 is a top view of an arrangement analogous to FIG. 6.

FIG. 7 is a three-dimensional illustration of bearing tube 70 with plastic part 80 mounted thereon, to illustrate outer ring 95.

Many variants and modifications are of course possible, within the scope of the present invention.

The invention claimed is:

1. An electric motor (21) that comprises:
   an internal stator (50);
   an external rotor (22) having a shaft (34), which external rotor is configured as a rotor cup (24) having an outer side and an inner side (25);
   a bearing tube (70) for reception of a bearing arrangement (60) journaling the shaft (34), which bearing tube (70) has a first end portion (71) facing toward said inner side (25) of the external rotor (22) and being formed with an inwardly protruding stop (73),
   said tube having a second end portion (75) facing away from the first end portion (71) and being joined to a plastic part (80) that likewise forms an inwardly protruding stop (77) adjacent said second end portion (75), the bearing arrangement (60) being arranged in a chamber defined by the bearing tube (70) between said two inwardly protruding stops (73, 77).

2. The motor according to claim 1, wherein
   an inner side of the second end portion (75) of the bearing tube (70) has an enlargement (78) to facilitate introduction of the bearing arrangement (60) into the bearing tube (70).

3. The motor according to claim 2, wherein
   a plastic element (65') is arranged in a region between the bearing arrangement (60) and the enlargement (78) of the second end portion (75) of the bearing tube (70).

4. The motor according to claim 2, wherein the outer side of the bearing tube (70) comprises a shoulder (79) adjacent said enlargement (78) of the second end portion (75).

5. The motor according to claim 1, wherein
   the bearing arrangement (60) comprises a first rolling bearing (72) and a second rolling bearing (76) which each comprise an outer ring (72", 76") and an inner ring (72', 76'),
   the first rolling bearing (72) being arranged adjacent the first end portion (71), and the second rolling bearing (76) adjacent the second end portion (75), of the bearing tube (70).

6. The motor according to claim 5, wherein
an end face (72''') of the outer ring (72") of the first rolling bearing (72) abuts against said stop (73) at the first end portion (71) of the bearing tube (70).

7. The motor according to claim 5, wherein
an end face (76''') of the outer ring (76") of the second rolling bearing (76) abuts against said stop (77) at the second end portion (75) of the bearing tube (70).

8. The motor according to claim 5, further comprising
between the outer ring (72") of the first rolling bearing (72) and the outer ring (76") of the second rolling bearing (76) a spacing member (74) which assures a predetermined distance between the outer bearing rings (72", 76").

9. The motor according to claim 8, wherein
an end face ($72^{IV}$) of the one outer ring (72") abuts against a first face of the spacing member (74), and an end face ($76^{IV}$) of the other outer ring (76") abuts against a second face of the spacing member (74).

10. The motor according to claim 5, wherein
the inner ring (76') of the second rolling bearing (76) abuts an annular supporting member (92) which is secured on the shaft (34) of the external rotor (22).

11. The motor according to claim 10, wherein the annular supporting member is implemented as a snap ring (92).

12. The motor according to claim 5, wherein
there is provided, between an inner surface (25) of the external rotor (22) and the inner ring (72') of the first rolling bearing (72"), a compression spring (94) that biases said inner ring (72') in the direction of the second rolling bearing (76).

13. The motor according to claim 1, wherein the bearing tube (70) is a shaped element made of metal.

14. The motor according to claim 1, further comprising a fan wheel (20,23) coupled for rotation with said rotor (22).

15. The motor according to claim 14, wherein the plastic part (80) is implemented as a flange of the fan (20).

16. The motor according to claim 15, wherein the plastic part (80) is joined to a cover part (40) to form a fan housing.

17. The motor according to claim 16, wherein the cover part (40) is coupled to the plastic part (80) by interengaging latching elements (42', 47').

18. The motor according to claim 1, wherein a fan wheel (23) is provided on the rotor cup (24).

19. The motor according to claim 18, further comprising a hub (30) which connects the rotor cup (24) to one end portion (32) of the shaft (34).

20. The motor according to claim 18, further comprising fan blades (26) provided on the fan wheel (23).

21. The motor according to claim 14, wherein the motor is an electronically commutated motor.

22. The motor according to claim 1, wherein said plastic part (80), which serves as an inwardly projecting stop (77) adjacent the second end section (75), is formed as an injection-molded part, which is pressed into the bearing tube (70).

* * * * *